H. W. SANFORD.
SPRING.
APPLICATION FILED MAY 12, 1914. RENEWED JAN. 15, 1917.
1,217,507.
Patented Feb. 27, 1917.
2 SHEETS—SHEET 1.
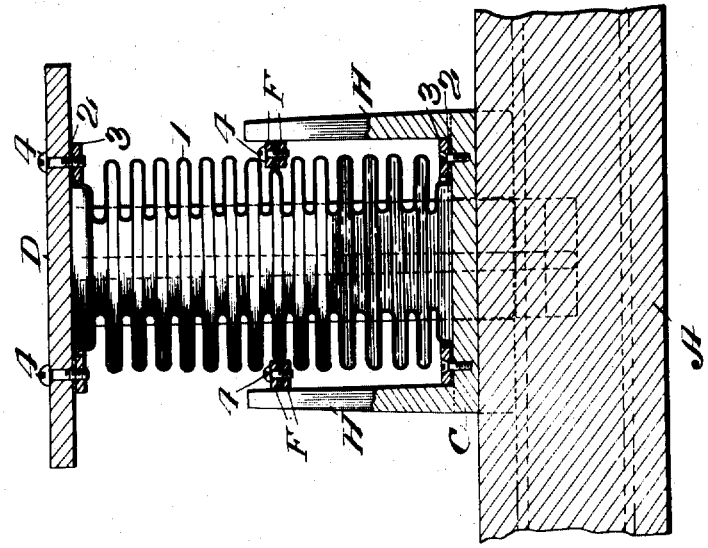
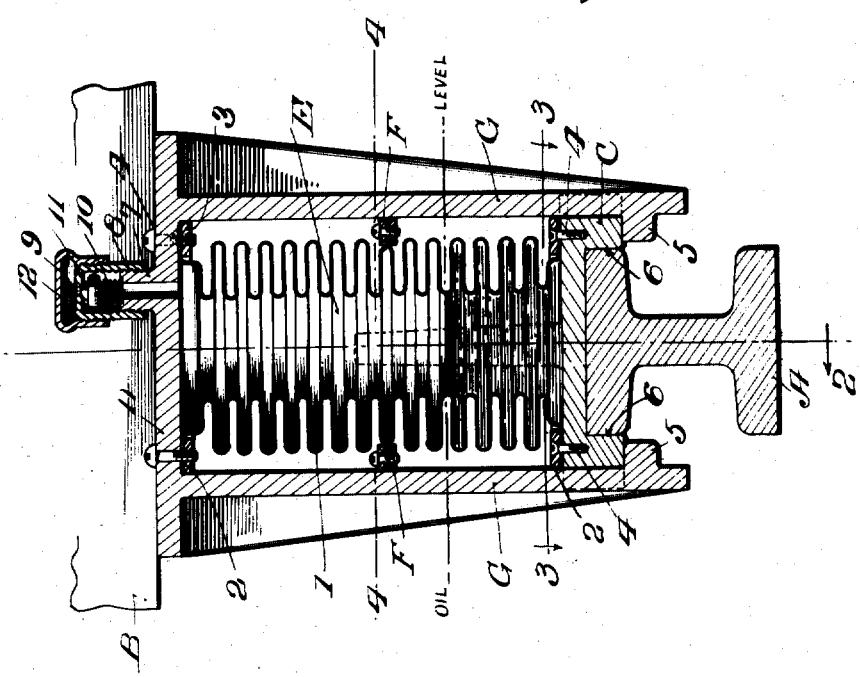
Witnesses
Inventor
Hugh W. Sanford
By Cyrus Kehr
Attorney

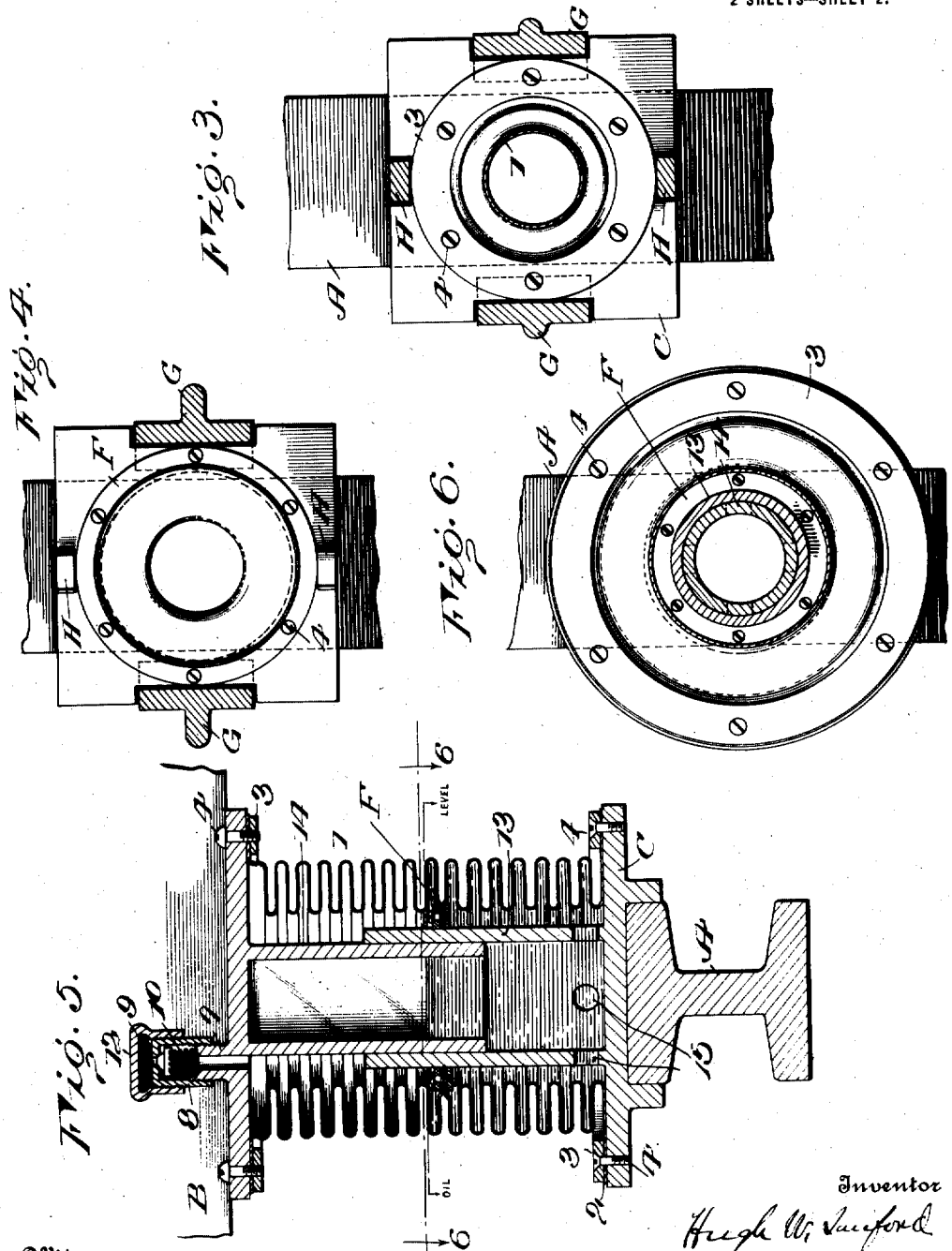
H. W. SANFORD.
SPRING.
APPLICATION FILED MAY 12, 1914. RENEWED JAN. 15, 1917.
1,217,507.
Patented Feb. 27, 1917.
2 SHEETS—SHEET 2.

UNITED STATES PATENT OFFICE.

HUGH W. SANFORD, OF KNOXVILLE, TENNESSEE.

SPRING.

1,217,507. Specification of Letters Patent. Patented Feb. 27, 1917.

Application filed May 12, 1914, Serial No. 838,004. Renewed January 15, 1917. Serial No. 142,558.

*To all whom it may concern:*

Be it known that I, HUGH W. SANFORD, a citizen of the United States, residing at Knoxville, in the county of Knox and State of Tennessee, have invented a new and useful Improvement in Springs, of which the following is a specification, reference being had to the accompanying drawing.

My improvement relates particularly to springs wherein air or any other gaseous medium is used as a resilient element, such resilient element being contained, under more or less compression, in a compressible chamber which constitutes a support or resistance for a body or member which is to be protected from shocks. When the spring is applied to a vehicle, the vehicle body is to be protected from shocks imparted by the roadway or rails to the wheels of the vehicle. If so desired, such springs may be associated coöperatively with other springs of any desired type; but the elastic fluid springs of the invention may be used without such association.

Heretofore in the art of spring suspension, air cushioning instrumentalities have been suggested as a substitute for the metallic elliptical or coil springs, but such attempts have, as far as at present known, been unproductive of any substantial or material advantages over the common form of suspension. This is attributed to the fact that in the use of expansible, inflated rubber bulbs there is at all times a variable condition, a quick deterioration of the compressed air container employed, and insufficient strength. In the relatively movable piston type of cushion or pneumatic spring heretofore suggested, many objections have been found in the adaptation of the device for general service, among which may be mentioned the inability to maintain proper resisting conditions to load and pressures; the necessity of the employment of a relatively movable sliding association of parts, permitting the escape of the contained fluids; and the entrance of foreign substance through the joint, requiring constant attention in the way of lubrication to prevent wear. The present invention is designed to overcome the objections heretofore found to exist in the pneumatic spring art and relates more particularly to a construction wherein a collapsible metallic tube is employed, compressible and expansible in one direction only, namely longitudinally or lengthwise and non-expansible transversely. Heretofore, it has been suggested to employ a convoluted tube of this character capable of longitudinal movement only as distinguished from lateral expansion or contraction, but as far as I am now advised, such suggestions have been substantially unsatisfactory, owing to the lack of provision for maintaining the proper air resistance at all times for various loads, in a manner to prevent destructive collapse or over-compression, which would result in cracking or breakage of the flexible metallic convoluted walls of the container. The present invention may therefore be briefly stated to comprise a structure wherein a convoluted metallic container is employed, non-expansible laterally, but freely collapsible longitudinally, and provided with means whereby the container may be charged with air under high compression, sufficient to render the device initially operative as a spring or buffer, without the danger of disrupting or breaking the flexible convoluted metallic walls under service conditions.

In carrying out the present invention, I employ what is known as a "convoluted tube" composed of a flexible sheet metal plate having transverse convolutions or corrugations, each of which is provided with parallel walls and curved connecting walls. Such a structure with its multiplicity of parallel walls is capable of resisting laterally a very high internal pressure, estimated approximately one thousand pounds to the square inch, while at the same time it yields to very moderate or light pressures lengthwise. I have found, however, that for successful employment of such a tube as a cushioning device, it is necessary to maintain within the tube a material resistance in the form of compressed air or other gases to an amount or to an extent that there will be present an initial resistance to endwise movement. The compressed charge serves also as a means for preventing collapsing beyond the breaking or disrupting point or the point of abrasive contact of the convolutions. The invention therefore, consists primarily in the formation of a pneumatic spring wherein the said convoluted metal tube is employed and providing the same with means for charging it primarily with a highly compressed air or gas in an amount sufficient to perform the work desired and to maintain the spring at all times in proper working condition. Further, to add to the interior of the spring, a liquid or other medium, which will permit the effective collapse or compression of the tube, while creating in an inverse ratio a resistance so that the compressed gas will act as a resisting medium progressively and momentarily throughout the working movement of the spring, and finally, to associate with such a structure, proper means for maintaining the spring against accidental overcollapse and against sidewise movement.

For the convenience in description, it will be assumed that the spring is applied to an automobile or other road vehicle, the direction of action of the spring being on an upright line. For other uses, the direction of action may be on lines which are not upright.

In the accompanying drawings,

Figure 1 is a sectional elevation of a structure embodying my improvement;

Fig. 2 is a sectional elevation of the mechanism shown in Fig. 1, looking toward the right;

Fig. 3 is a section on the line, 3—3, of Fig. 1;

Fig. 4 is a section on the line, 4—4, of Fig. 1;

Fig. 5 is a sectional elevation of another form of the mechanism;

Fig. 6 is a section on the line, 6—6, of Fig. 5.

Referring first to Fig. 1, A is an axle of the vehicle and B is a part of the vehicle body or any sustaining member applied thereto. On the axle, A, is a base plate, suitably secured thereto, and immediately below the part, B, is a top plate, D. Between the base and said top plate is a sheet metal tube, E, formed into horizontal convolutions, 1, similar to the convolutions of an accordion bellows. Said wall is preferably formed of a plurality of sections each consisting of a single piece of metal which is spun to form annular convolutions, 1, of sufficient width to allow a considerable range of flexibility of the convolutions, whereby said tube may be compressed by endwise pressure or lengthened by pulling lengthwise of the tube. At its lower end, said tube has an outward-directed flange, 2, fitting closely upon the upper face of the lower end plate, C, and firmly secured thereto in any suitable manner, as by means of a clamping ring, 3, and screws, 4. The upper end of said tube has a similar flange, 2, bearing against the lower face of the upper end plate, D, and similarly secured to said plate by means of a clamping ring, 3, and screws, 4. The sheet metal wall is divided transversely into two sections and the meeting ends have outward-directed flanges, 2, which are clamped between two rings, F, F, which are joined to each other by means of screws, 4. Said rings constitute a guide member for the tube, as described below. At each side of the axle and the end plate, C, is an upright guide arm, G, extending downward from and rigid with the upper end plate, D. Said arms are free to slide up and down relative to the plate, C, and the axle; but said arms are substantially prevented from moving horizontally either transversely to or in the direction of the length of the axle. The latter may be done in various ways, as by means of shoulders, 6, on the plate, C. To limit the upward movement of the upper end plate, stop lugs, 5, 5, are placed on the inner faces of the guide arms, G, below the lower end plate.

The opposite sides of the tube and midway between the guide arms, G, are standards, H, which are of suitable height to bear against the upper end plate when the latter has descended as far as desired. Said standards serve as stops for limiting the compression of the spring. The ring-form guide member composed of the two rings, F, F, extends outward near enough to the guide arms, G, and the standards, H, to be guided by said arms and standards during the compression and extension of the tube. Said ring-form guide member serves as a stay to prevent the flexible tube from buckling sidewise while the tube is filled with compressed air. While said tube needs such lateral staying, the thin metal of which the wall of said tube is composed must not be allowed to slide against a resisting surface, for that would wear and weaken such wall so as to cause its breaking.

From the end plate, D, rises a tubular neck, 7, the exterior of which is screw threaded. A cap, 8, is exteriorly screw threaded and fits around the neck, 7. In the upper end of the cap, 8, is a port, 9. Within said cap is an expanding coiled spring, 10, resting upon the neck, 7, and bearing against a ball valve, 11, which rests across the port, 9. The upper portion of the exterior of the cap, 8, is screw-threaded and receives the interiorly screw-threaded outer cap, 12. In this manner, the chamber formed by the two end plates and the tube is provided with a valved inlet. When the cap, 12, has ben removed, a tube leading from an air pump or air compressor may be coupled to the upper portion of the cap, 8, and the air then driven through said tube and through the port, 9, the cap, 8, and the neck, 7. Thus the chamber formed by the tube, E, and the plates, C and D, is filled with compressed air to a density suitable to the load to be carried. All of the weight of the vehicle body, and its load, may be supported by springs thus formed or these springs and springs of another type may jointly carry the load.

The wall of the tube, E, is made of only such thickness and quality as will afford sufficient strength to confine the air within said chamber, no dependence for supporting the load being placed upon said tube taken by itself. The wall of said tube is made as thin and flexible as is consistent with strength, and the air within the chamber is relied upon for elasticity. The efficiency of the tube as a resilient sustaining member or medium is so small in comparison with the efficiency of the air within said chamber as a resilient or elastic sustaining medium that it may be ignored.

The height and diameter of the tube, E, are to be varied according to the weight of the vehicle body and according to the desired sensitiveness of the spring. Such tubes may be made amply strong to contain air under suitable density to support a heavy vehicle body, as, for example, an automobile body, and yet afford such flexibility as will allow the tube to repeatedly shorten and lengthen during the relative up and down movement of the vehicle body.

The tube, E, is not of sufficient strength to maintain its upright position against tendency of the vehicle body to shift relatively horizontally. To permit only upright movement of the vehicle body relative to the axle, the guide arms, G, are placed with their inner faces upright and parallel to each other and near the axle, or any part supported thereby, in such manner as to substantially prevent horizontal movement, as above described. It may be said that the structure is such as to permit and limit the movement of the vehicle body substantially to a course which is upright and perpendicular to the axle or parallel to the length of the flexible tube. In the form shown in Fig. 1, the guide arms, G, G, operating in conjunction with the lower end plate, constitute means for permitting such movement and substantially no other. But when these springs are applied to a road vehicle, the guide arms should not so engage as to limit absolutely to upright movement. On account of inertia and momentum of the vehicle, allowance should be made for some horizontal movement relative to the axles; but such horizontal movement should be slight.

The capacity of the chamber formed by the tube, E, and the end plates for receiving air may be varied by partially filling said chamber with liquid, as indicated in Fig. 1. Such liquid is preferably an oil which remains in liquid form under ordinary temperatures. Oil is preferable to water, because the oil protects the inner faces of the tube and the base plate and top plate from corrosion. When it is found that the spring is more resilient than is desired, the introduction of liquid will reduce the resiliency.

In the form shown in Fig. 5, the arms, G, G, are omitted and the means used for limiting the vehicle body to a line which is perpendicular to the axle and upright is placed within the tube, E. For this purpose I show a rigid guide tube, 13, rising from the lower plate, C, and a rigid guide tube, 14, extending downward from the upper end plate, D, and telescoping into the tube, 13. This structure may be used by filling the chamber formed by the tube and the top and bottom plates with air only, or said chamber may be filled in part with liquid, preferably oil.

The tube, 13, is shown as having ports, 15, near the base plate. Said ports are amply large to permit a free flow of air or liquid to maintain equilibrium within and around the tubes, 13 and 14. The volume of air to be received by the chamber formed by the tube, E, and the two end plates may be varied by placing oil within said chamber in the manner already described regarding Fig. 1.

To adapt the structure to receive oil, as described, the end plates and the tube, E, must be made of material which will not deteriorate in the presence of oil. Metal is suited to this purpose. The oil which regulates the air space in the tube, E, also lubricates the guide tubes, 13 and 14, in Fig. 5. And in this form, the guide member composed of the rings, F, F, extends inward far enough to meet the guide tube, 13.

The air pressure should normally bring the stop lugs, 5, 5, a little below the lower end plate.

From the above it will be observed that in use the interior of the convoluted tube will be charged with compressed air in a sufficient amount to initially perform the work, and by the employment of the ball valve, the air charge may be increased or diminished in conformity with the load of work to be done, and further, that by the addition of the oil or other filler, the full effective action of the compressible tube is permitted, while the charge of compressed gas or air is confined in the upper portion of the tube whereby a fractional compression of the transversely convoluted sheet metal tube leads to a multiple compression of the air within the tube and that fractional compression should be less than one-half of the full length of the tube to preserve the proper relation of the parts and prevent or avoid the related parts of the convolutions from being brought into destructive relation or contact.

It is to be understood that many changes can be made in the constructions shown without departing from the nature and principle of the invention.

I claim as my invention,

1. In a mechanism of the nature described, the combination of two end plates, a sheet-metal tube transversely convoluted and elastic lengthwise and substantially non-elastic transversely and having its ends secured to said end plates, one of said members being provided with a valved inlet, and means for relatively limiting said plates for movement only parallel to the length of said tube, substantially as described.

2. A spring comprising a vessel having rigid end walls and transversely convoluted metallic side walls yieldable only along the lines of the vessel's collapse, said vessel containing a charge of initially compressed gas of a density to materially resist initial compression, and a valved charging port in one wall of the vessel.

3. A spring comprising a vessel having rigid end walls and transversely convoluted elastic metallic side walls yieldable only along the lines of the vessel's collapse, said vessel containing a charge of initially compressed gas of a density to materially resist initial compression, a filling body within the vessel, and a valved charging port in one wall of the vessel.

4. In a mechanism of the nature described, the combination of two end plates, an upright sheet-metal tube transversely convoluted and elastic lengthwise and substantially non-elastic transversely and having its ends secured to said end plates, the upper of said end plates being provided with a valved inlet, and means for relatively limiting said plates for upright movement only, substantially as described.

5. In a mechanism of the nature described, the combination of two end plates, a flexible sheet-metal tube transversely convoluted and having its ends secured to said plates, one of said three members being provided with a valved inlet, a guide member on said tube, and means for relatively limiting said guide member and said plates for movement parallel to the length of said tube, substantially as described.

6. In a mechanism of the nature described, the combination of two end plates, an upright flexible sheet-metal tube transversely convoluted and having its ends secured to said end plates, one of said three members being provided with a valved inlet, a guide member on said tube, and means for relatively limiting said guide member and said plates for upward movement, substantially as described.

7. In a mechanism of the nature described, the combination of two end plates, a flexible sheet-metal tube transversely convoluted and having its ends secured to said end plates, one of said three members being provided with a valved inlet, means for relatively limiting said plates for movement parallel to the length of said tube, and means applied to said tube between its ends for limiting the movement of the tube transversely to its length, substantially as described.

8. In a mechanism of the nature described, the combination of two end plates and a tube, one of said three members being provided with a valved inlet, and said tube consisting of two flexible, transversely convoluted sheet-metal sections and a guide member joining said sections, and means for relatively limiting said end plates for movement parallel to the length of said tube, substantially as described.

9. In a mechanism of the nature described, the combination of two end plates, a tube consisting of two flexible, transversely convoluted sheet-metal sections and a guide member joining said sections, one of said end plates being provided with a valved inlet, and means for relatively limiting said end plates for movement parallel to the length of said tube, substantially as described.

10. In a mechanism of the nature described, the combination of two end plates, an upright tube consisting of two flexible, transversely convoluted sheet-metal sections and a guide member joining said sections, one of said three members being provided with a valved inlet, and means for relatively limiting said plates for upright movement, substantially as described.

11. In a mechanism of the nature described, the combination of two end plates, an upright tube having its ends secured to said end plates and consisting of two flexible, transversely convoluted sheet-metal sections and a guide member joining said sections, the upper of said end plates being provided with a valved inlet, and means for relatively limiting said plates for upright movement, substantially as described.

12. A spring comprising a vessel having rigid end walls and transversely convoluted elastic metallic side walls yieldable only along the line of the vessel's collapse, said vessel containing a charge of initially compressed gas of a density to materially resist initial compression, a valved charging port in one of the vessel's walls, and means for checking the expansion of the vessel.

13. A spring comprising a vessel having rigid end walls and transversely convoluted elastic metallic side walls yieldable only along the line of the vessel's collapse, said vessel containing a charge of initially compressed gas of a density to materially resist initial compression, a valved charging port in one of the vessel's walls, and means for limiting the compression of the vessel.

14. A spring comprising a vessel having rigid end walls and transversely convoluted elastic metallic side walls yieldable only along the line of the vessel's collapse, said vessel containing a charge of initially compressed gas of a density to materially resist initial compression, a valved charging port in one of the vessel's walls, and means for limiting the expansion and compression of the vessel.

15. In a mechanism of the nature described, the combination of two end plates, a flexible sheet-metal tube transversely convoluted and having its ends secured to said end plates, one of said three members being provided with a valved inlet, and means for relatively limiting said plates for movement parallel to the length of said tube and preventing the flexible tube from buckling sidewise between its ends, substantially as described.

16. In a mechanism of the character described, the combination of two end plates, a flexible sheet-metal tube transversely convoluted and having its ends secured to said end plates, one of said end plates being provided with a valved inlet, and means for relatively limiting said end plates for movement parallel to the length of said tube and preventing the flexible tube from buckling sidewise between its ends, substantially as described.

17. In a mechanism of the nature described, the combination of two end plates, an upright flexible sheet-metal tube transversely convoluted and having its ends secured to said end plates, one of said three members being provided with a valved inlet, and means for relatively limiting said plates for upright movement and preventing the flexible tube from buckling sidewise between its ends, substantially as described.

18. In a mechanism of the nature described, the combination of two end plates, a flexible sheet-metal tube transversely convoluted and having its ends secured to said end plates, one of said three members being provided with a valved inlet, and means for relatively limiting said plates for movement parallel to the length of said tube and for limiting the movement of the plates toward and from each other and preventing the flexible tube from buckling sidewise between its ends, substantially as described.

19. In a mechanism of the nature described, the combination of two end plates, an upright flexible sheet-metal tube transversely convoluted and having its ends secured to said end plates, the upper of said end plates being provided with a valved inlet, and means for preventing the flexible tube from buckling sidewise between its ends, substantially as described.

20. A spring comprising a vessel having rigid end walls and transversely convoluted elastic metallic side walls yieldable only along the line of the vessel's collapse, said vessel containing a charge of initially compressed gas of a density to materially resist initial compression, a valved charging port in one wall of the vessel, and means intermediate the ends of the vessel for resisting sidewise movement of the vessel.

21. A spring comprising a vessel having rigid end walls and transversely convoluted elastic metallic side walls yieldable only along the line of the vessel's collapse, said vessel containing a charge of initially compressed gas of a density to materially resist initial compression, a valved charging port in one wall of the vessel, and a guide intermediate the ends of the vessel for resisting sidewise movement of the vessel.

22. A spring comprising a vessel having rigid end walls and transversely convoluted elastic metallic side walls yieldable only along the line of the vessel's collapse, said vessel containing a charge of initially compressed gas of a density to materially resist initial compression, a valved charging port in one wall of the vessel, a guide intermediate the ends of the vessel for resisting sidewise movement of the vessel, and rigid projecting means on which the guide moves.

23. A spring comprising a vessel having rigid end walls and transversely convoluted elastic metallic side walls yieldable only along the line of the vessel's collapse, said vessel containing a charge of initially compressed gas of a density to materially resist initial compression, a valved charging port in the upper wall of the vessel, and an upright rigid member on the lower wall of the vessel arranged to limit the downward movement of the upper wall.

24. A spring comprising a vessel having rigid end walls and transversely convoluted elastic metallic side walls yieldable only along the line of the vessel's collapse, said vessel containing a charge of initially compressed gas of a density to materially resist initial compression, a valved charging port in the upper wall of the vessel, and a depending projection on the upper wall having an offset adapted to engage below the lower wall.

25. A spring comprising a vessel having rigid end walls and transversely convoluted elastic metallic side walls yieldable only along the line of the vessel's collapse, said vessel containing a charge of initially compressed gas of a density to materially resist initial compression, a valved charging port in the upper wall of the vessel, an upright rigid member on the lower wall of the vessel arranged to limit the downward movement of the upper wall, and a depending projection on the upper wall having an offset adapted to engage below the lower wall.

26. A spring comprising a vessel having rigid end walls and transversely convoluted elastic metallic side walls yieldable only along the line of the vessel's collapse, said vessel containing a charge of initially compressed gas of a density to materially resist initial compression, a filling body within the vessel, a valved charging port in one wall of the vessel, and means for relatively limiting the movement of said end walls.

27. A spring comprising a vessel having rigid end walls and transversely convoluted elastic metallic side walls yieldable only along the line of the vessel's collapse, said vessel containing a charge of initially compressed gas of a density to materially resist initial compression, a filling body within the vessel, a valved charging port in one wall of the vessel, and means for preventing lateral movement of the side walls.

In testimony whereof I have signed my name, in presence of two witnesses, this 28th day of April, in the year one thousand nine hundred and fourteen.

HUGH W. SANFORD.

Witnesses:
S. E. HODGES,
CYRUS KEHR.